(12) United States Patent
Okuoka

(10) Patent No.: US 10,802,246 B2
(45) Date of Patent: Oct. 13, 2020

(54) OPTICAL SYSTEM AND IMAGE PICKUP APPARATUS

(71) Applicant: CANON KABUSHIKI KAISHA, Tokyo (JP)

(72) Inventor: Shinya Okuoka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 202 days.

(21) Appl. No.: 16/158,603

(22) Filed: Oct. 12, 2018

(65) Prior Publication Data

US 2019/0113711 A1   Apr. 18, 2019

(30) Foreign Application Priority Data

Oct. 16, 2017   (JP) ................... 2017-200167

(51) Int. Cl.
| | |
|---|---|
| *G02B 9/12* | (2006.01) |
| *H04N 5/232* | (2006.01) |
| *G02B 7/04* | (2006.01) |
| *G02B 15/163* | (2006.01) |
| *G02B 5/20* | (2006.01) |
| *G02B 27/64* | (2006.01) |

(52) U.S. Cl.
CPC ............. *G02B 9/12* (2013.01); *G02B 7/04* (2013.01); *G02B 15/163* (2013.01); *H04N 5/23212* (2013.01); *H04N 5/23248* (2013.01); *G02B 5/208* (2013.01); *G02B 27/646* (2013.01)

(58) Field of Classification Search
CPC .......... G02B 9/12; G02B 15/163; G02B 7/04; G02B 5/208; G02B 27/646; H04N 5/23212; H04N 5/23248
USPC ........................................ 359/642, 754, 784
See application file for complete search history.

(56) References Cited

U.S. PATENT DOCUMENTS

| | | | |
|---|---|---|---|
| 2019/0025560 A1 | 1/2019 | Okuoka | |
| 2020/0088972 A1* | 3/2020 | Yoo ................ | G02B 15/14512 |

FOREIGN PATENT DOCUMENTS

| | | |
|---|---|---|
| JP | 2014021340 A | 2/2014 |
| JP | 2015215494 A | 12/2015 |

* cited by examiner

*Primary Examiner* — Tuyen Tra
(74) *Attorney, Agent, or Firm* — Carter, DeLuca & Farrell LLP

(57) ABSTRACT

An optical system includes, in order from object side, a first unit, a stop, a second unit, and a third unit. The first and second units are moved toward object side to increase respective intervals from the third unit for focusing from infinity to proximity. The first unit includes a negative lens and a positive lens arranged adjacent and on image side of the negative lens. The third unit consists of a positive lens (G3P) and a negative lens (G3N) arranged adjacent and on image side of the positive lens (G3P). An equivalent air length from a lens surface on image side of the negative lens (G3N) to an image plane when focused at infinity, and a distance on an optical axis from a lens surface on object side of a lens (G1F) arranged closest to object side, to the image plane when focused at infinity are appropriately set.

12 Claims, 11 Drawing Sheets

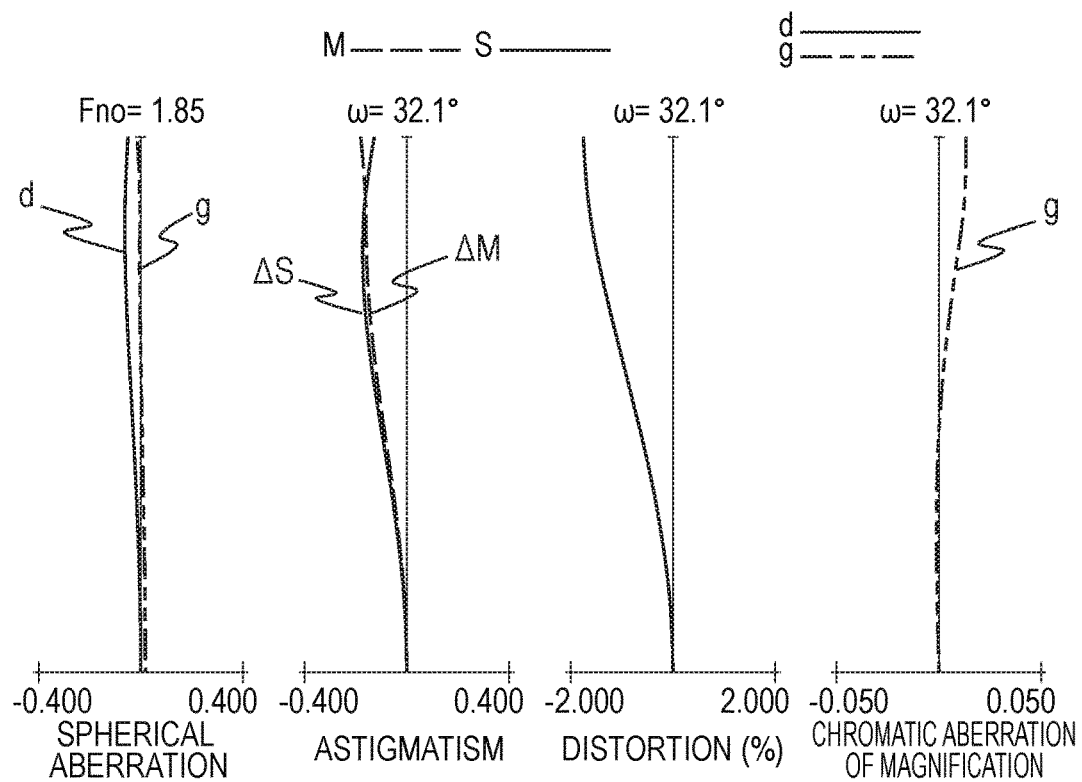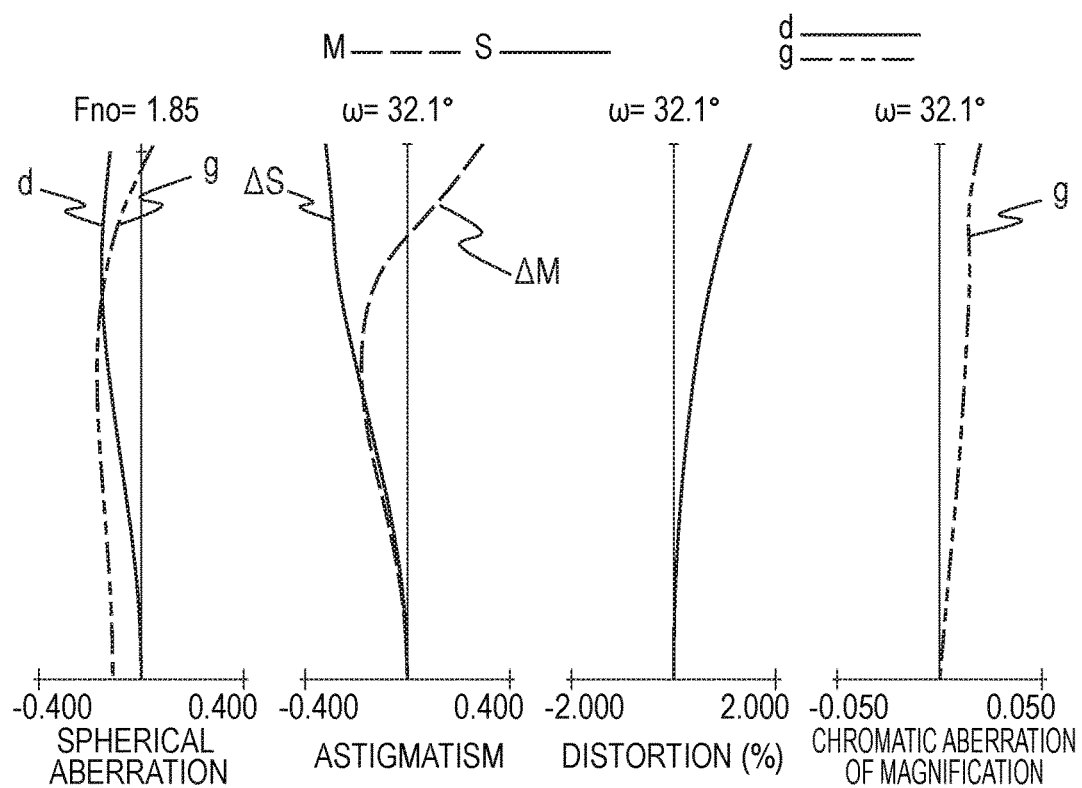

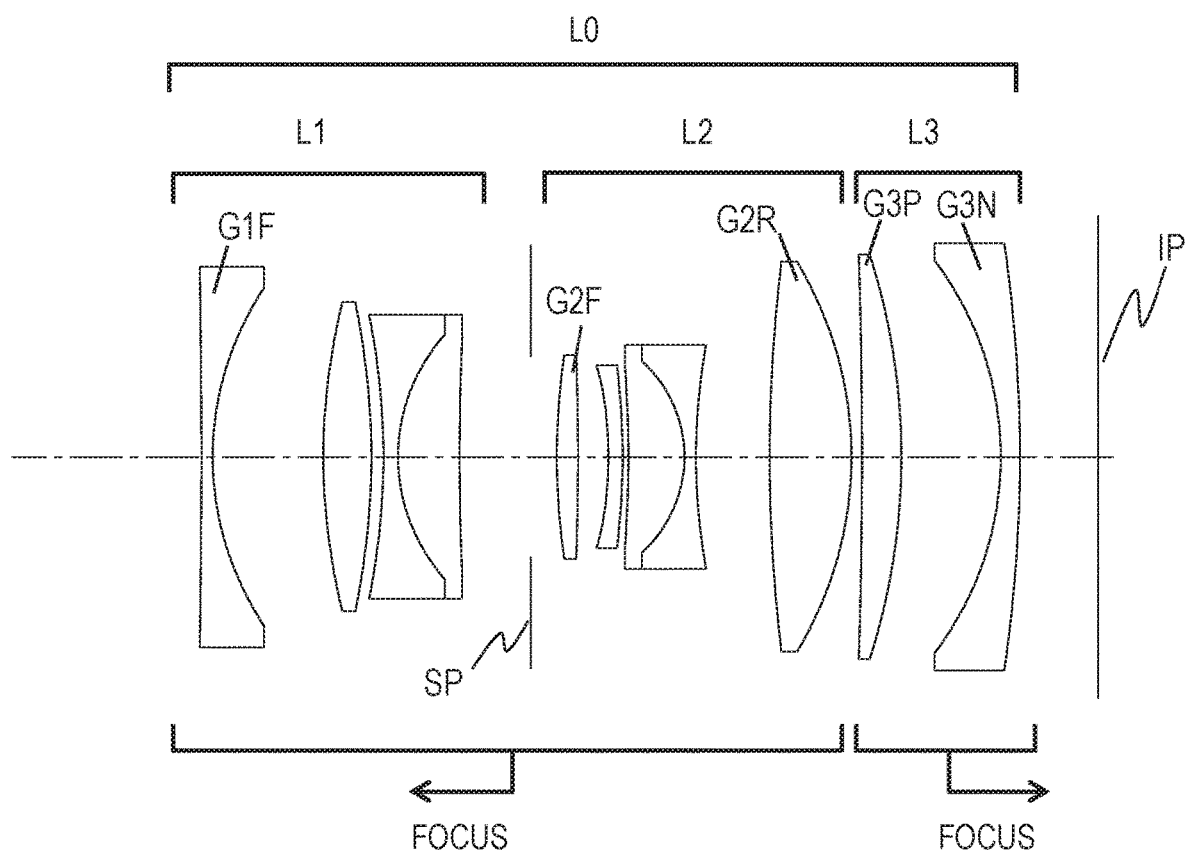

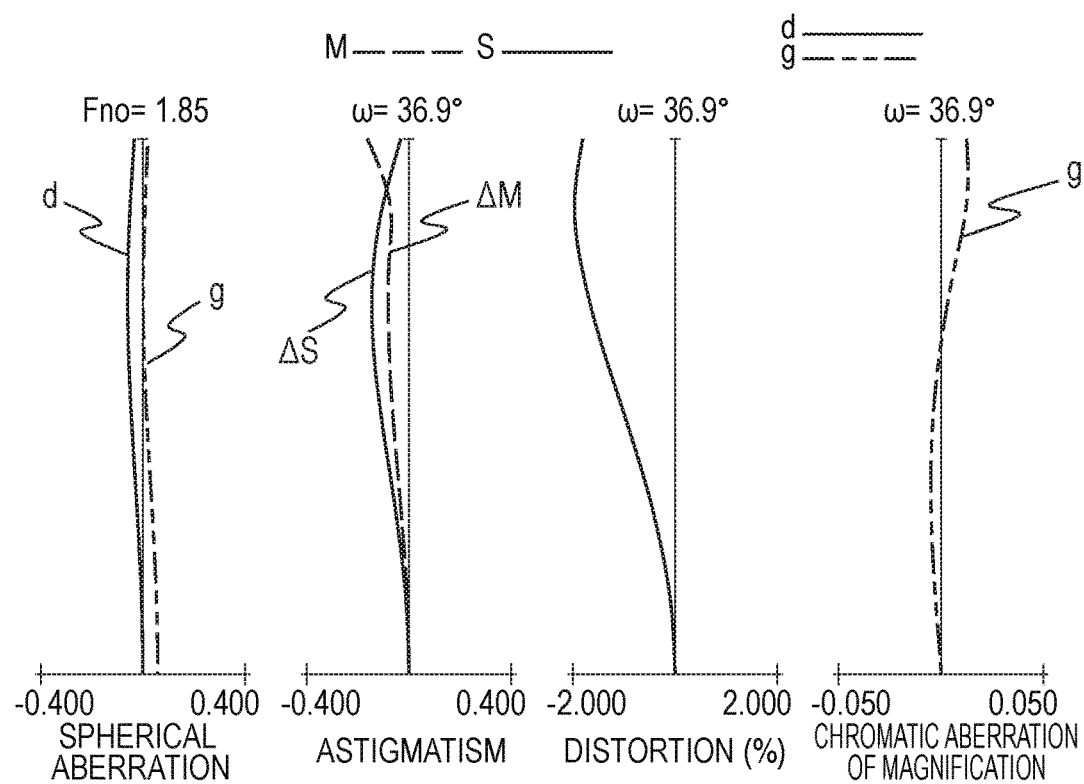
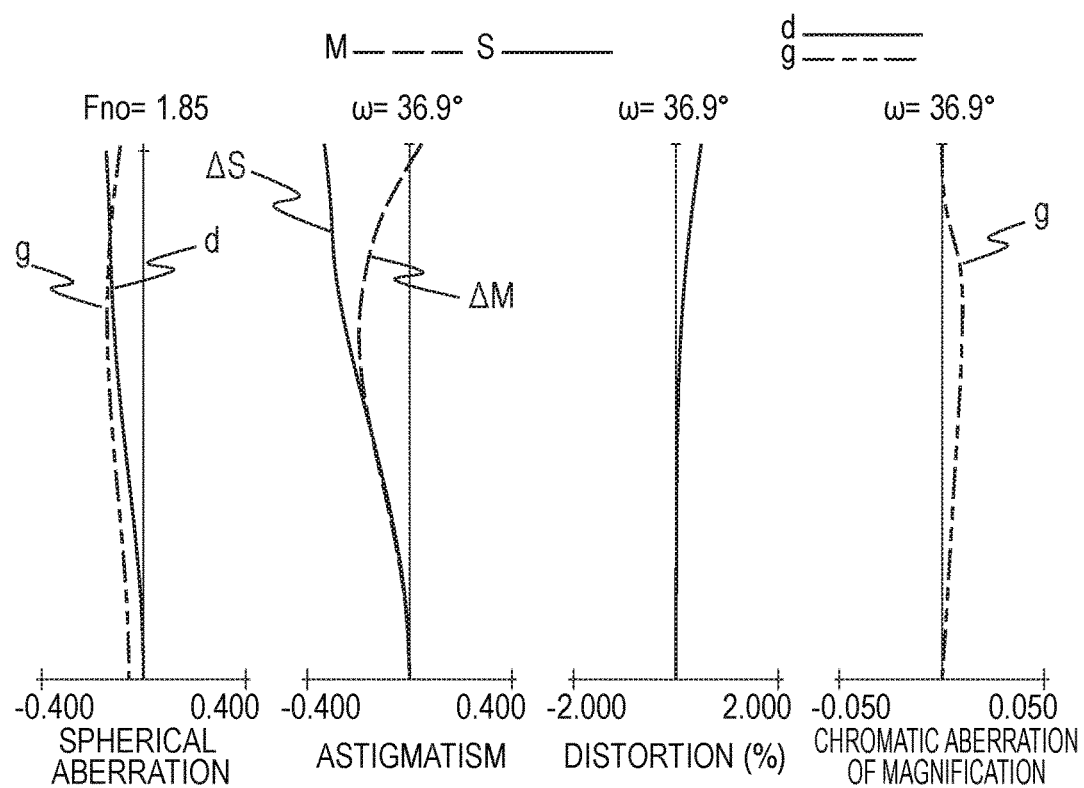

OPTICAL SYSTEM AND IMAGE PICKUP APPARATUS

BACKGROUND OF THE INVENTION

Field of the Invention

The present invention relates to an optical system, which is particularly suitable for an image pickup apparatus, for example, a single lens reflex camera, a digital still camera, a video camera, or a monitoring camera.

Description of the Related Art

In recent years, it is required of an optical system (image pickup optical system) used with an image pickup apparatus to have a large aperture ratio, cause a small aberration variation during focusing from infinity to proximity, and have high optical performance over the entire focus range.

In particular, there is required an optical system enabling easy photography at proximity with an image pickup magnification of about equal magnification and having high optical performance. In general, in many optical systems, as an image pickup magnification becomes higher, variations in various aberrations accompanying focusing, for example, spherical aberration and other various aberrations become larger to reduce the optical performance.

In the related art, there has been known an optical system employing a focusing system with a small aberration variation during focusing from infinity to proximity. In Japanese Patent Application Laid-Open No. 2014-21340, there is disclosed an image forming lens consisting of, in order from an object side to an image side, a first lens unit having a positive refractive power, a second lens unit having a positive refractive power, and a third lens unit having a negative refractive power. In Japanese Patent Application Laid-Open No. 2014-21340, the first lens unit and the second lens unit are configured to move integrally toward the object side during focusing from infinity to proximity.

In Japanese Patent Application Laid-Open No. 2015-215494, there is disclosed an optical system consisting of, in order from an object side to an image side, a first lens unit having a positive refractive power, a second lens unit having a positive refractive power, and a third lens unit having a negative refractive power. In Japanese Patent Application Laid-Open No. 2015-215494, the first lens unit and the second lens unit are configured to move toward the object side such that an interval between the first lens unit and the second lens unit is increased during focusing from infinity to proximity. In addition, in Japanese Patent Application Laid-Open No. 2015-215494, the first lens unit and the second lens unit are configured to move toward the object side, and the third lens unit is configured to move along a locus that is convex toward the image side such that intervals among the first lens unit, the second lens unit, and the third lens unit are changed during focusing from infinity to proximity.

In general, an optical system having a large aperture ratio causes large spherical aberration and other various aberrations, and is difficult to satisfactorily correct the various aberrations. In particular, during focusing from infinity to proximity with the image pickup magnification of about equal magnification, the variations in various aberrations are increased, and it becomes difficult to obtain high optical performance.

In order to obtain an optical system having a large aperture ratio, and having high optical performance during focusing from infinity to proximity, in particular, having high optical performance during photography at proximity with about equal magnification, it becomes important to appropriately set a focusing lens unit, a lens configuration, and other conditions.

SUMMARY OF THE INVENTION

According to one embodiment of the present invention, there is provided an optical system including a plurality of lens units, the plurality of lens units consisting of, in order from an object side to an image side, a first lens unit having a positive refractive power, an aperture stop, a second lens unit having a positive refractive power, and a third lens unit having a negative refractive power, the first lens unit and the second lens unit being configured to move toward the object side so that an interval between the first lens unit and the third lens unit and an interval between the second lens unit and the third lens unit are increased for focusing from infinity to a close object distance, the first lens unit including a negative lens and a positive lens arranged adjacent to and on the image side of the negative lens, the third lens unit consisting of a positive lens G3P and a negative lens G3N, which is arranged adjacent to and on the image side of the positive lens G3P, wherein a conditional expression:

$$sk/TD < 0.17,$$

is satisfied where "sk" represents an equivalent air length from a lens surface on the image side of the negative lens G3N to an image plane when the optical system is focused at infinity, and TD represents a distance on an optical axis from a lens surface on the object side of a lens G1F, which is arranged closest to the object side in the optical system, to the image plane when the optical system is focused at infinity.

Further features of the present invention will become apparent from the following description of exemplary embodiments with reference to the attached drawings.

BRIEF DESCRIPTION OF THE DRAWINGS

FIG. 4A is an aberration diagram of the optical system according to Example 2 when focused at infinity.

FIG. 4B is an aberration diagram of the optical system according to Example 2 when focused on an object with an image pickup magnification β=−0.5.

FIG. 7 is a lens cross-sectional view of an optical system according to Example 4 of the present invention when focused at infinity.

FIG. 8A is an aberration diagram of the optical system according to Example 4 when focused at infinity.

FIG. 8B is an aberration diagram of the optical system according to Example 4 when focused on an object with an image pickup magnification β=−0.5.

DESCRIPTION OF THE EMBODIMENTS

Preferred embodiments of the present invention will now be described in detail in accordance with the accompanying drawings.

Now, exemplary embodiments of the present invention are described with reference to the accompanying drawings. An optical system according to an Example of the present invention consists of, in order from an object side to an image side, a first lens unit having a positive refractive power, an aperture stop, a second lens unit having a positive refractive power, and a third lens unit having a negative refractive power. Each of the first lens unit and the second lens unit is configured to move toward the object side so that an interval from the third lens unit is increased during focusing from infinity to proximity.

Figure 1:
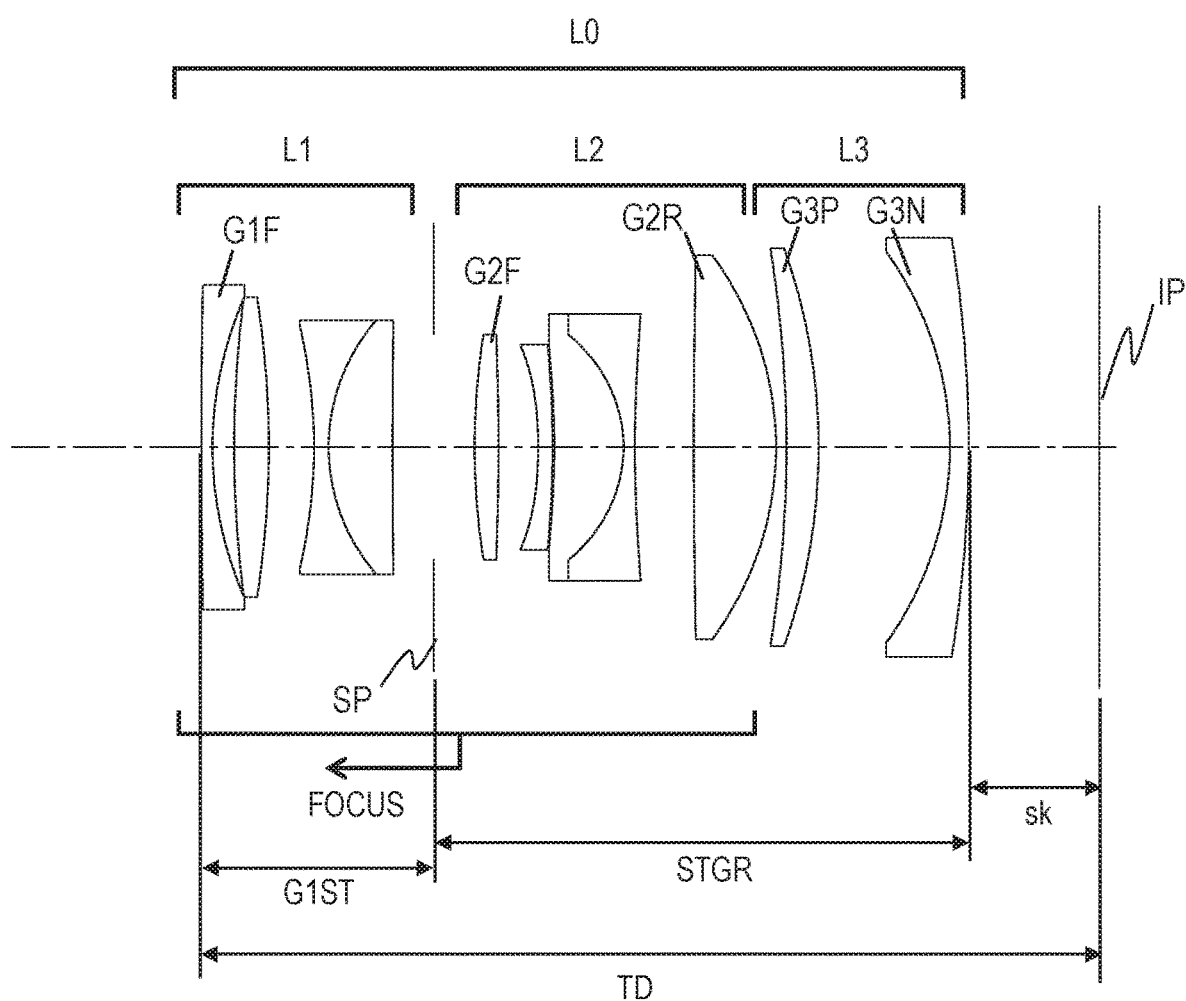
FIG. 1 is a lens cross-sectional view of an optical system according to Example 1 of the present invention when focused at infinity.
Figure 2A:
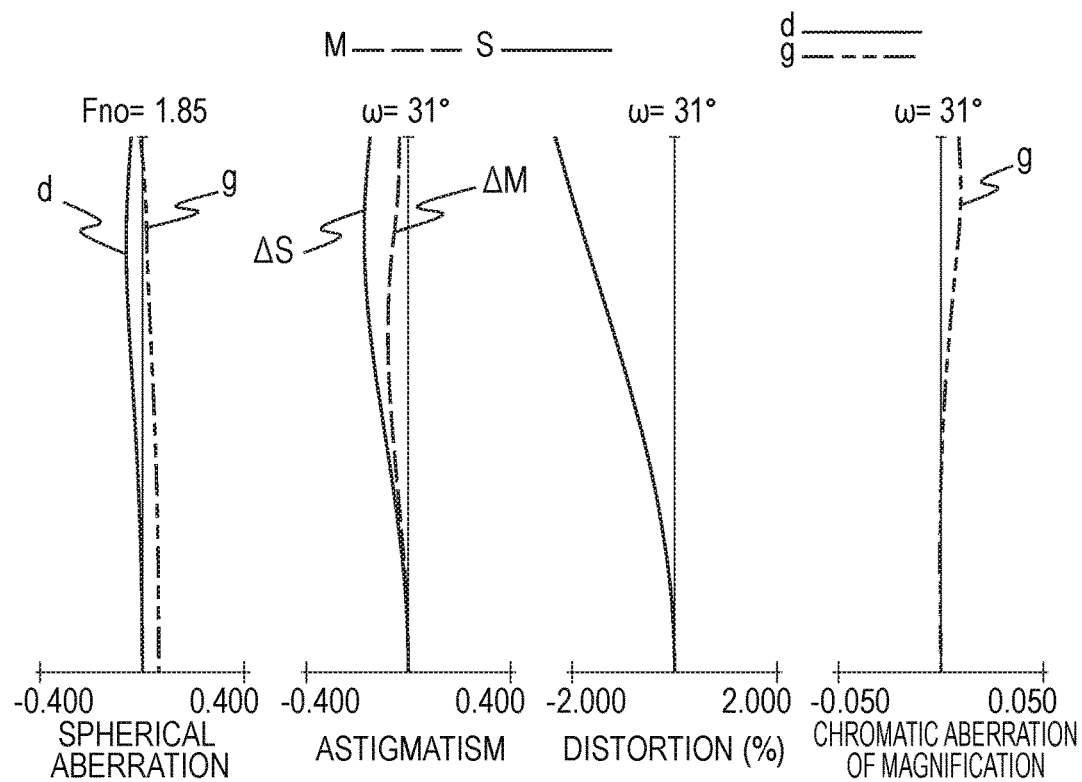
FIG. 2A is an aberration diagram of the optical system according to Example 1 when focused at infinity.
Figure 2B:
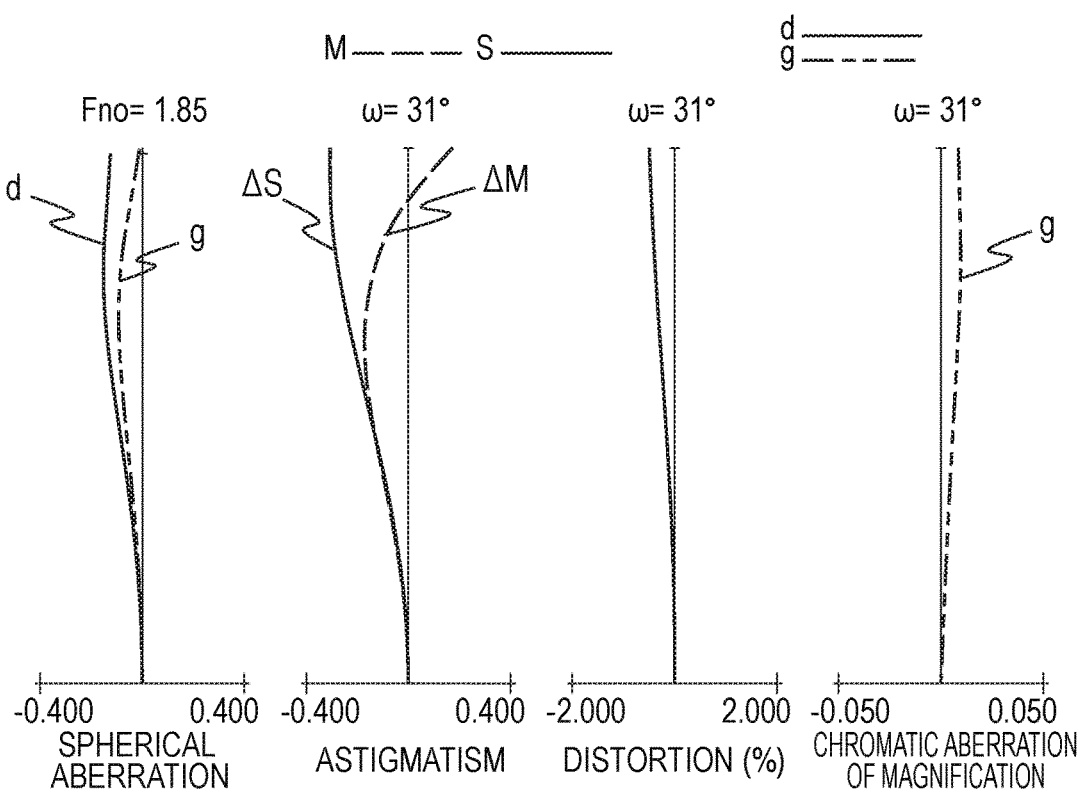
FIG. 2B is an aberration diagram of the optical system according to Example 1 when focused on an object with an image pickup magnification β=−0.5.

FIG. 1 is a lens cross-sectional view of Example 1 of the present invention when the optical system is focused at infinity. FIG. 2A and FIG. 2B are aberration diagrams of Example 1 when the optical system is focused at infinity and when an image pickup magnification β=−0.5, respectively. Example 1 is an optical system having an F-number of 1.85 and an image pickup angle of view of 62°.

Figure 3:
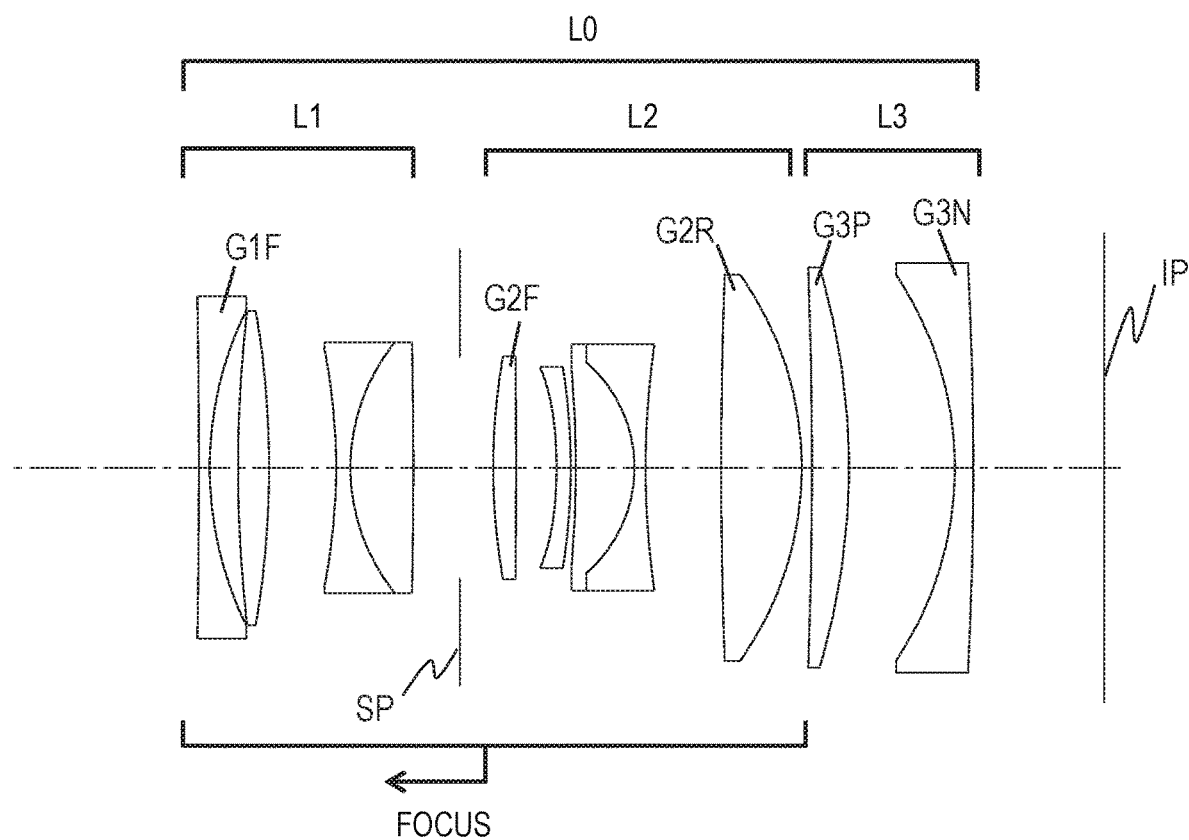
FIG. 3 is a lens cross-sectional view of an optical system according to Example 2 of the present invention when focused at infinity.

FIG. 3 is a lens cross-sectional view of Example 2 of the present invention when the optical system is focused at infinity. FIG. 4A and FIG. 4B are aberration diagrams of Example 2 when the optical system is focused at infinity and when an image pickup magnification β=−1.0, respectively. Example 2 is an optical system having an F-number of 1.85 and an image pickup angle of view of 62.14°.

Figure 5:
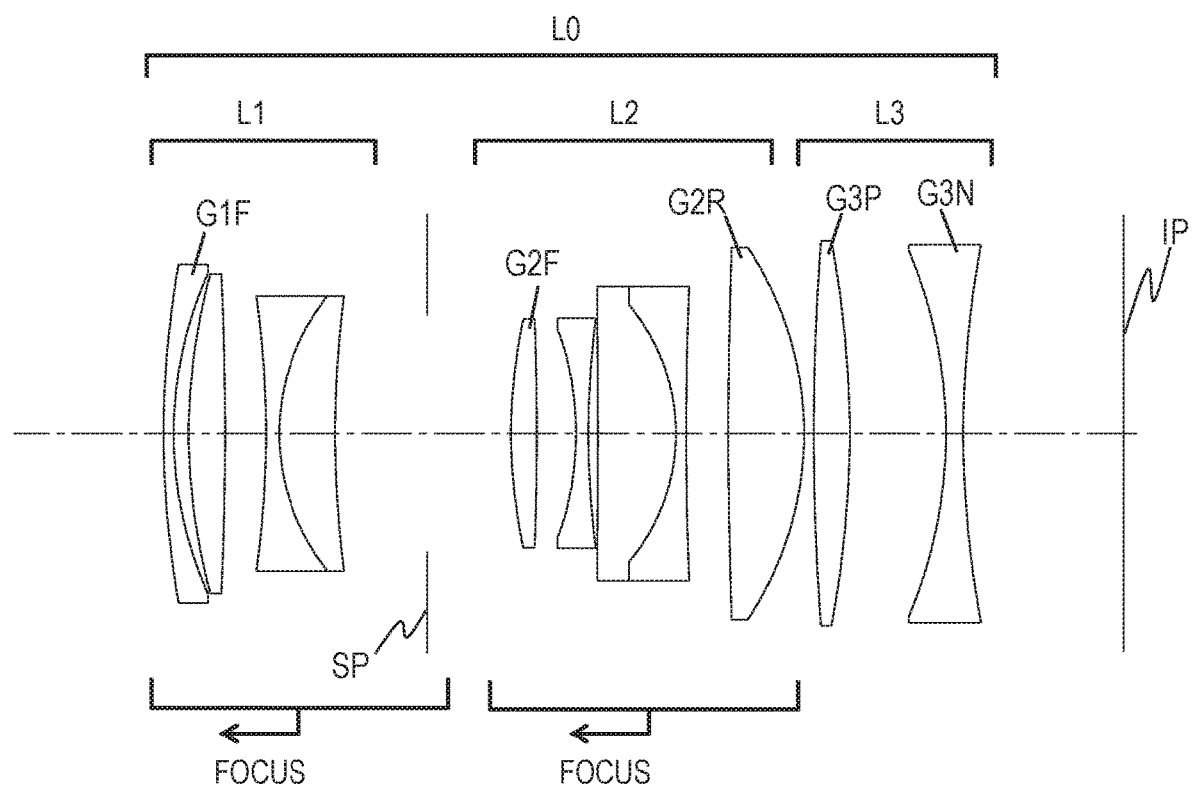
FIG. 5 is a lens cross-sectional view of an optical system according to Example 3 of the present invention when focused at infinity.
Figure 6A:
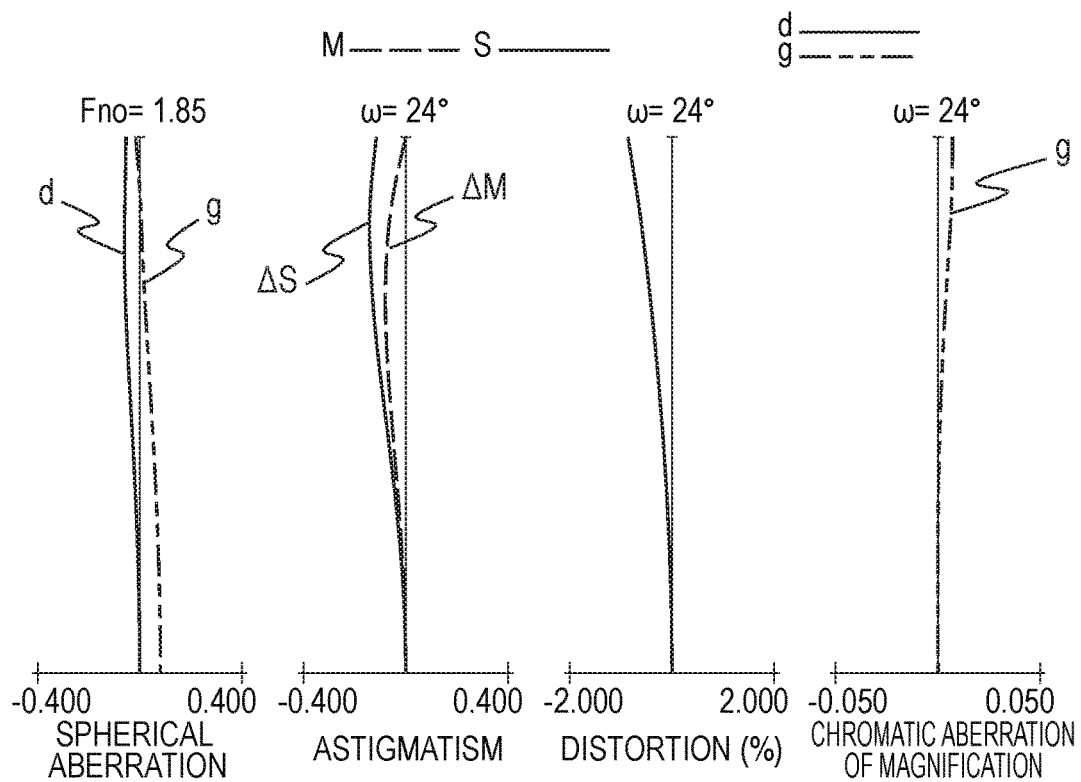
FIG. 6A is an aberration diagram of the optical system according to Example 3 when focused at infinity.
Figure 6B:
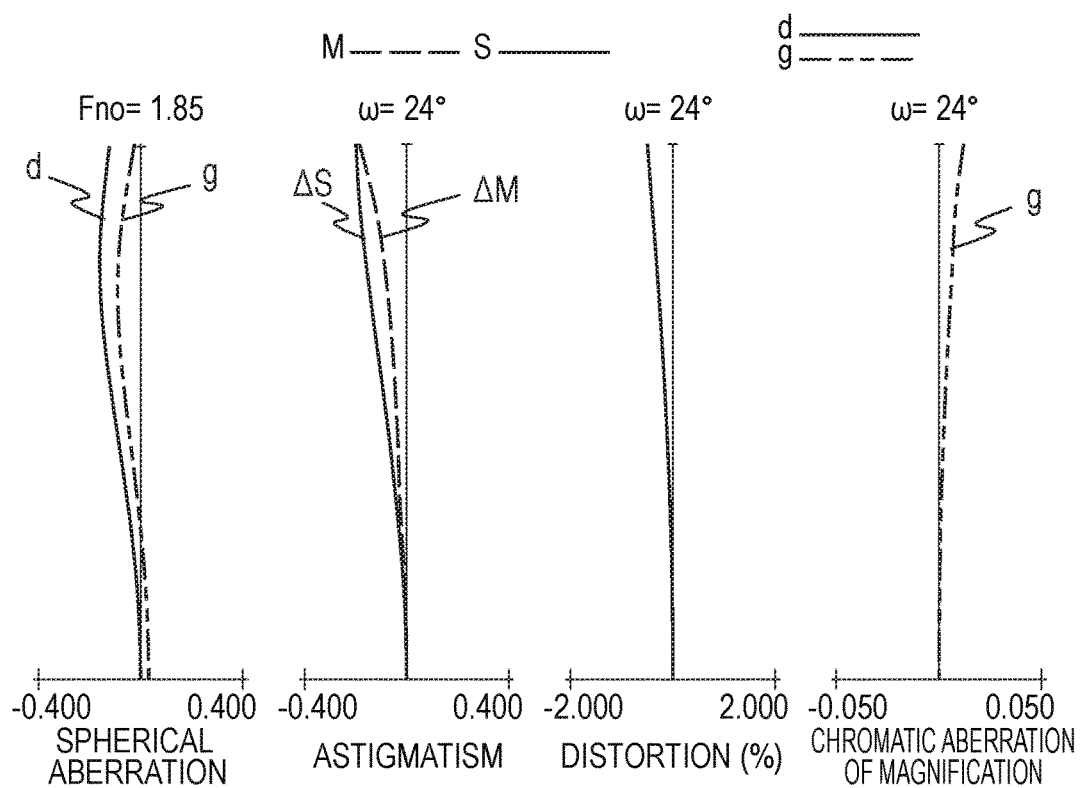
FIG. 6B is an aberration diagram of the optical system according to Example 3 when focused on an object with an image pickup magnification β=−0.5.

FIG. 5 is a lens cross-sectional view of Example 3 of the present invention when the optical system is focused at infinity. FIG. 6A and FIG. 6B are aberration diagrams of Example 3 when the optical system is focused at infinity and when an image pickup magnification β=−0.5, respectively. Example 3 is an optical system having an F-number of 1.85 and an image pickup angle of view of 48.08°.

FIG. 7 is a lens cross-sectional view of Example 4 of the present invention when the optical system is focused at infinity. FIG. 8A and FIG. 8B are aberration diagrams of Example 4 when the optical system is focused at infinity and when an image pickup magnification β=−0.5, respectively. Example 4 is an optical system having an F-number of 1.85 and an image pickup angle of view of 73.82°.

Figure 9:
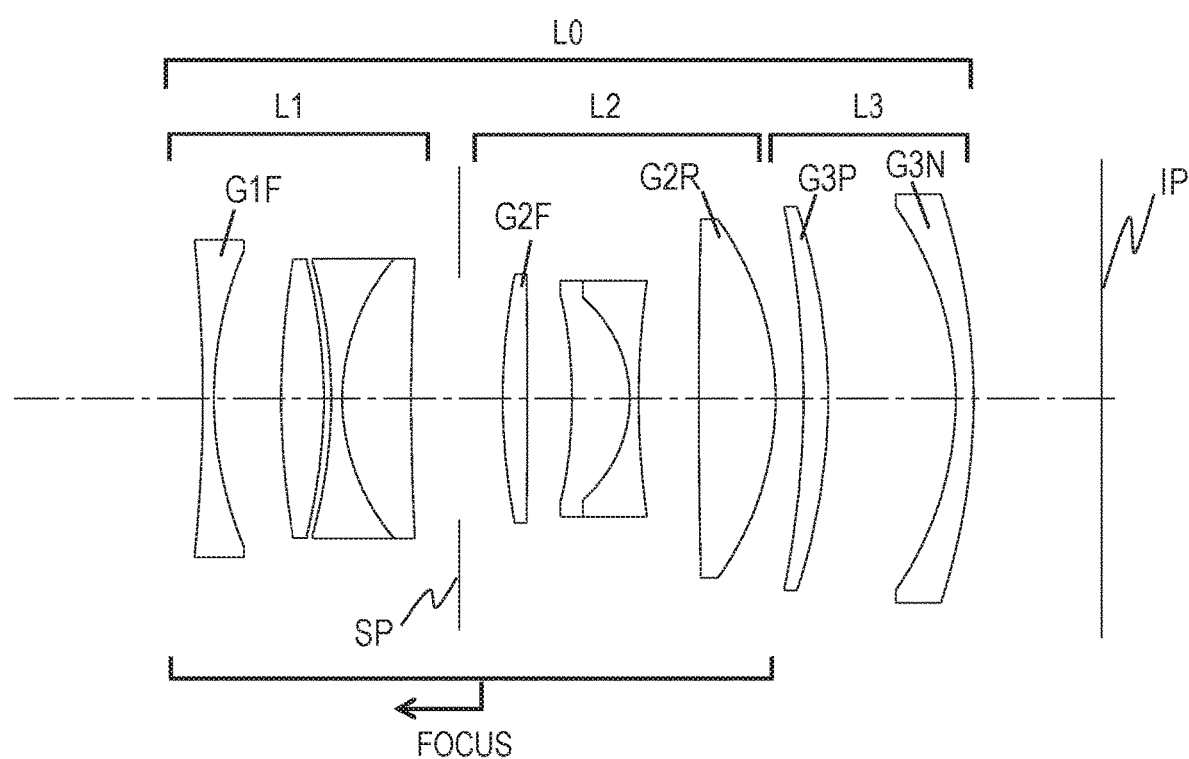
FIG. 9 is a lens cross-sectional view of an optical system according to Example 5 of the present invention when focused at infinity.
Figure 10A:
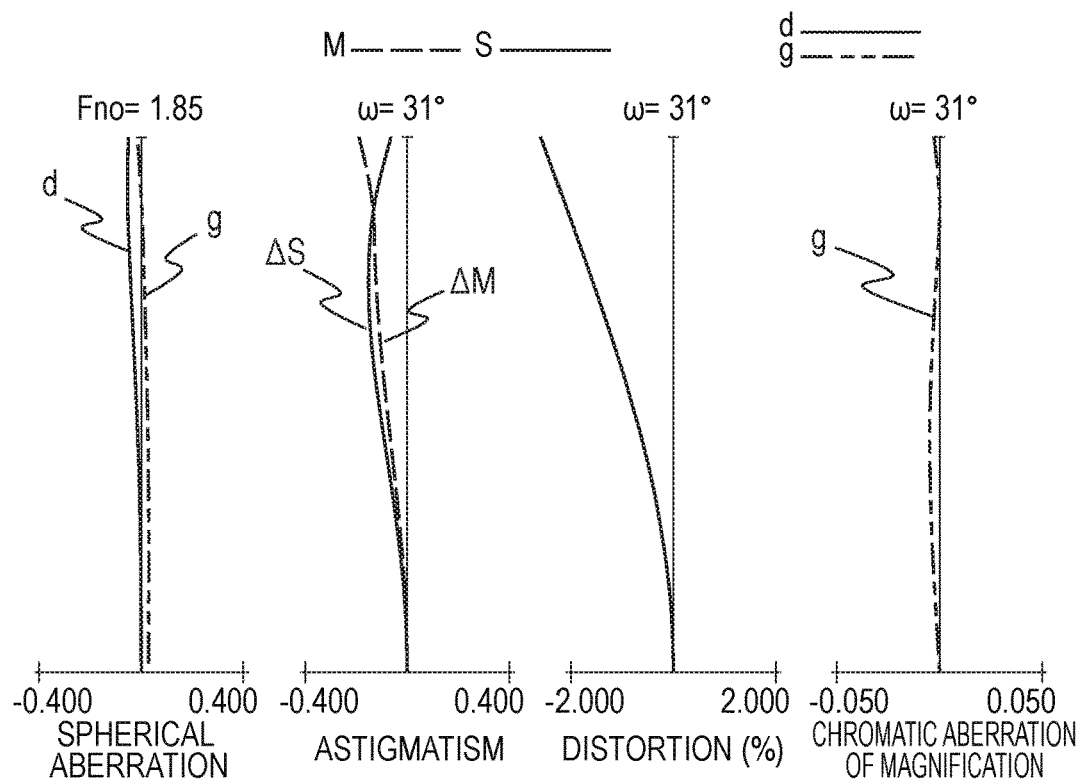
FIG. 10A is an aberration diagram of the optical system according to Example 5 when focused at infinity.
Figure 10B:
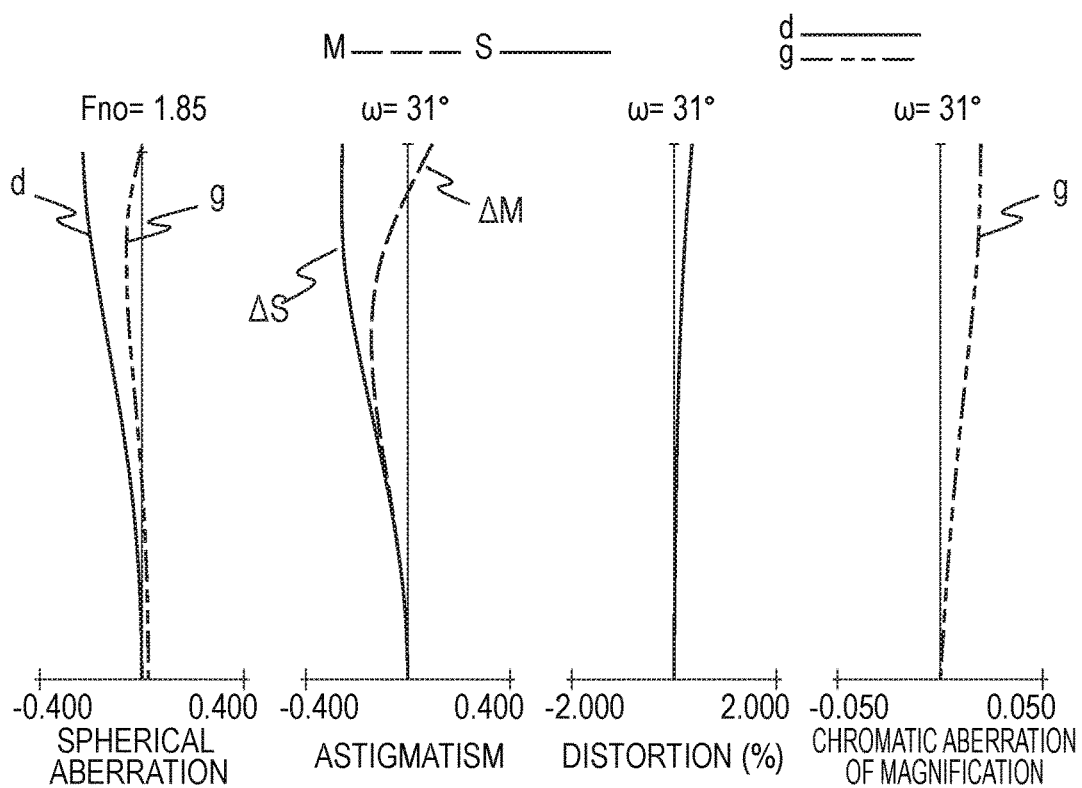
FIG. 10B is an aberration diagram of the optical system according to Example 5 when focused on an object with an image pickup magnification β=−0.5.

FIG. 9 is a lens cross-sectional view of Example 5 of the present invention when the optical system is focused at infinity. FIG. 10A and FIG. 10B are aberration diagrams of Example 5 when the optical system is focused at infinity and when an image pickup magnification β=−0.5, respectively. Example 5 is an optical system having an F-number of 1.85 and an image pickup angle of view of 62.0°.

Figure 11:
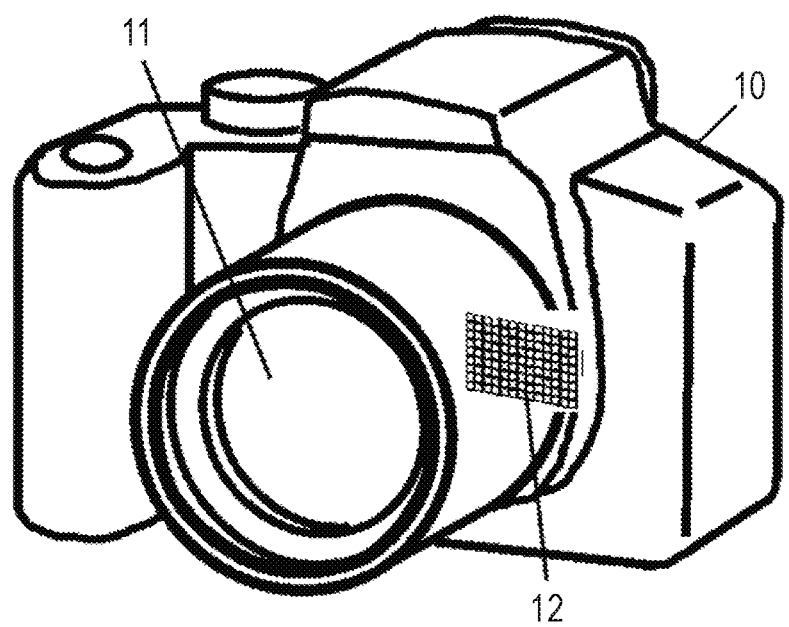
FIG. 11 is a schematic view of a main part of an image pickup apparatus for an optical system according to an Example of the present invention.

FIG. 11 is a schematic view of a main part of a digital still camera (image pickup apparatus) including the optical system according to an Example of the present invention.

The optical system according to each of Examples is an image pickup optical system for use with an image pickup apparatus, for example, a video camera, a digital still camera, or a TV camera. The optical system according to each of Examples may also be used as a projection optical system for a projection device (projector).

In the lens cross-sectional views, the left side is an object side (front side), and the right side is an image side (rear side). Moreover, in the lens cross-sectional views, an optical system is denoted by L0. When the order of a lens unit from the object side is represented by "i", the i-th lens unit is denoted by L1. An aperture stop SP determines (restricts) a light flux at the minimum F-number (Fno). As an image plane IP, an image pickup surface of an image pickup element (photoelectric conversion element), for example, a CCD sensor or a CMOS sensor, is placed when in use as an image pickup optical system of a video camera or a digital still camera. The arrow regarding "Focus" (focus) indicates a movement direction of a lens unit during focusing from infinity to proximity.

The optical system according to each of Example 1, Example 2, and Example 5 includes a first lens unit L1 having a positive refractive power, a second lens unit L2 having a positive refractive power, and a third lens unit L3 having a negative refractive power. The first lens unit L1 and the second lens unit L2 are configured to move integrally (along the same locus) toward the object side along an optical axis, and the third lens unit L3 is configured not to move during focusing from infinity to proximity.

The optical system according to Example 3 includes a first lens unit L1 having a positive refractive power, a second lens unit L2 having a positive refractive power, and a third lens unit L3 having a negative refractive power. The first lens unit L1 and the second lens unit L2 are configured to move along different movement loci toward the object side so that an interval between the first lens unit L1 and the second lens unit L2 is reduced, and the third lens unit L3 is configured not to move during focusing from infinity to proximity.

The optical system according to Example 4 includes a first lens unit L1 having a positive refractive power, a second lens unit L2 having a positive refractive power, and a third lens unit L3 having a negative refractive power. The first lens unit L1 and the second lens unit L2 are configured to move integrally toward the object side along an optical axis, and the third lens unit L3 is configured to move toward an image plane side along the optical axis during focusing from infinity to proximity.

In each of Example 1, Example 2, and Example 5, the first lens unit L1 and the second lens unit L2 may be configured to move by different movement amounts during focusing. In Example 3, the first lens unit L1 and the second lens unit L2 may be configured to move integrally during focusing. In Example 4, the third lens unit L3 may be configured not to move during focusing.

In the optical system according to each of Examples, a part of the lenses or a part of the lens units may be decentered in parallel in a direction perpendicular to the optical axis during image stabilization so as to have a function as an image stabilization optical system. Moreover, a parallel plate having substantially no refractive power, for example, a low-pass filter or an infrared cut filter, may be arranged between a lens having a refractive power that is arranged closest to the image side and the image pickup surface.

In the aberration diagrams, an F-number is represented by Fno. A half angle of view (degrees) is represented by "ω", and is an angle of view in ray tracing value. In the spherical aberration diagrams, a solid line "d" indicates a d-line (wavelength: 587.56 nm), a two-dot chain line "g" indicates a g-line (wavelength: 435.835 nm). In the astigmatism diagrams, a solid line ΔS indicates a sagittal image plane with respect to the d-line, and a broken line ΔM indicates a meridional image plane with respect to the d-line. The distortion is depicted for the d-line. In the diagrams of chromatic aberration of magnification, a two-dot chain line "g" indicates a g-line.

The optical system according to an Example of the present invention consists of, in order from an object side to an image side, a first lens unit L1 having a positive refractive power, an aperture stop SP, a second lens unit L2 having a positive refractive power, and a third lens unit L3 having a negative refractive power. Each of the first lens unit L1 and the second lens unit L2 is configured to move so that an interval from the third lens unit L3 is increased during focusing from infinity to proximity.

Moreover, the first lens unit L1 includes a negative lens and a positive lens arranged adjacent to the negative lens on the image side of the negative lens. The third lens unit L3 consists of, in order from the object side to the image side, a positive lens G3P and a negative lens G3N. With this configuration, the entire system is easily downsized, and good optical performance is easily obtained over the entire object distance with a large aperture ratio. Moreover, the second lens unit L2 includes a plurality of positive lenses, and a positive lens G2F, which is arranged closest to the object side of the positive lenses included in the second lens unit L2, is configured to move in a direction having a component that is perpendicular to the optical axis during image stabilization. With this configuration, rapid image stabilization is facilitated.

In each of Examples, an equivalent air length from a lens surface on the image side of the negative lens G3N to the image plane when the optical system is focused at infinity is represented by "sk". A distance on the optical axis from a lens surface on the object side of a lens G1F, which is arranged closest to the object side, to the image plane when the optical system is focused at infinity is represented by TD. In TD, the distance from the lens surface on the image side of the negative lens G3N to the image plane is an equivalent air length. At this time, the following conditional expression is satisfied:

$$sk/TD<0.17 \quad (1).$$

Technical meanings of the conditional expression (1) are described. The conditional expression (1) relates to a ratio between the equivalent air length (back focus) from the lens surface on the image side of the negative lens G3N to the image plane when the optical system is focused at infinity and the distance (total lens length) from the lens surface on the object side of the lens G1F to the image plane when the optical system is focused at infinity. When the upper limit value of the conditional expression (1) is exceeded, the back focus becomes much longer to increase the total lens length, and it becomes difficult to downsize the entire system.

In each of Examples, it is further preferred to set the numerical value range of the conditional expression (1) as follows.

$$0.07<sk/TD<0.17 \quad (1a)$$

It is still further preferred to set the numerical value range of the conditional expression (1a) as follows.

$$0.08<sk/TD<0.17 \quad (1b)$$

The conditional expression (1) is satisfied while appropriately setting lens configurations of the lens units as described above to obtain the optical system that is easy to downsize the entire system and has the good optical performance over the entire object distance.

In each of Examples, it is further preferred to satisfy at least one of conditional expressions provided below. A focal length of the first lens unit L1 is represented by "f1", and a focal length of the second lens unit L2 is represented by "f2". A focal length of the entire system of the optical system is represented by "f", and a focal length of the third lens unit is represented by "f3". An Abbe number of a material of the lens G1F with respect to the d-line is represented by G1vd. The second lens unit L2 includes a lens G2R having a positive refractive power closest to the image side. A curvature radius of a lens surface on the object side of the lens G2R is represented by L2R1, and a curvature radius of a lens surface on the image side of the lens G2R is represented by L2R2.

A distance on the optical axis from the lens surface on the object side of the lens G1F to the aperture stop SP is represented by G1ST, and a distance on the optical axis from the aperture stop SP to the lens surface on the image side of the lens G3N is represented by STGR when the optical system is focused at infinity.

At this time, it is preferred to satisfy at least one of the following conditional expressions.

$$1.1<f1/f2<3.0 \quad (2)$$

$$0.15<|f/f3|<0.40 \quad (3)$$

$$15.0<G1vd<30.0 \quad (4)$$

$$|L2R2/L2R1|<0.3 \quad (5)$$

$$0.3<G1ST/STGR<0.8 \quad (6)$$

Next, technical meanings of each of the conditional expressions given above are described. The conditional expression (2) is intended to appropriately set a ratio of the focal length of the first lens unit L1 to the focal length of the second lens unit L2. When the ratio falls below the lower limit value of the conditional expression (2), and the focal length of the second lens unit L2 becomes much longer, the total lens length is increased. Moreover, when the ratio exceeds the upper limit value, and the focal length of the second lens unit L2 becomes much shorter, the total lens length becomes shorter, but it becomes difficult to correct spherical aberration and other various aberrations.

The conditional expression (3) is intended to appropriately set a ratio between the focal length of the third lens unit L3 and the focal length of the entire system when the optical system is focused at infinity. When the ratio falls below the lower limit value of the conditional expression (3), and the negative refractive power of the third lens unit L3 becomes weaker (absolute value of the negative refractive power becomes smaller), the total lens length when the optical system is focused at infinity is increased. Moreover, when the ratio exceeds the upper limit value, the total lens length is reduced, but a variation in curvature of field during focusing is disadvantageously increased.

The conditional expression (4) is intended to appropriately set the Abbe number of the material of the lens G1F with respect to the d-line (wavelength: 587.56 nm). When the value exceeds the upper limit value or falls below the lower limit value, it becomes difficult to correct chromatic aberration of magnification, and it becomes difficult to obtain high optical performance over the entire object distance.

The conditional expression (5) is intended to appropriately set a ratio between the curvature radius of the lens surface on the object side and the curvature radius of the lens surface on the image side of the positive lens G2R, which is arranged closest to the image side in the second lens unit L2. When the ratio exceeds the upper limit value of the conditional expression (5), and the curvature radius of the lens surface on the image side approaches the curvature radius of the lens surface on the object side, the variation in curvature of field during focusing is increased.

The conditional expression (6) is intended to appropriately set a ratio of the distance from the lens surface on the object side of the lens G1F to the aperture stop SP to the distance from the aperture stop SP to the lens surface on the image side of the lens G3N when the optical system is focused at infinity. When the ratio falls below the lower limit value or exceeds the upper limit value of the conditional expression (6), the distance on the object side or the image side of the aperture stop SP becomes much shorter, and it becomes difficult to correct comatic aberration, distortion, and other off-axial aberrations.

It is further preferred to set the numerical value ranges of the conditional expressions (2) to (6) as follows.

$$1.15 < f1/f2 < 3.00 \quad (2a)$$

$$0.18 < |f/f3| < 0.30 \quad (3a)$$

$$15.0 < G1vd < 29.0 \quad (4a)$$

$$|L2R2/L2R1| < 0.27 \quad (5a)$$

$$0.40 < G1ST/STGR < 0.75 \quad (6a)$$

It is still further preferred to set the numerical value ranges of the conditional expressions (2a) to (6a) as follows.

$$1.2 < f1/f2 < 2.8 \quad (2b)$$

$$0.20 < |f/f3| < 0.29 \quad (3b)$$

$$20.0 < G1vd < 28.0 \quad (4b)$$

$$|L2R2/L2R1| < 0.25 \quad (5b)$$

$$0.40 < G1ST/STGR < 0.70 \quad (6b)$$

Next, a digital still camera (image pickup apparatus) according to one embodiment of the present invention, which uses the optical system according to each of Examples as an image pickup optical system, is described with reference to FIG. 11.

In FIG. 11, a camera main body 10, and an image pickup optical system 11 formed of any one of the optical systems described in Examples 1 to 5 are illustrated. A solid-state image pickup element (photoelectric conversion element) 12 such as a CCD sensor or a CMOS sensor is included in the camera main body, and is configured to receive an object image formed by the image pickup optical system 11. The optical system according to each of Examples may also be used as a projection optical system for a projection device (projector).

While the present invention has been described with reference to exemplary Examples, it is to be understood that the invention is not limited to the disclosed exemplary Examples. The scope of the following claims is to be accorded the broadest interpretation so as to encompass all such modifications and equivalent structures and functions.

Numerical Data 1 to 5 respectively corresponding to Examples 1 to 5 are provided below. In each set of Numerical Data, the order of a surface as counted from the object side is represented by "i". In Numerical Data, a curvature radius of the i-th lens surface as counted from the object side is represented by "ri", the i-th lens thickness and air interval as counted from the object side is represented by "di", and a refractive index and an Abbe number of a material of the i-th lens as counted from the object side are represented by "ndi" and "vdi", respectively.

Moreover, in addition to specifications, such as the focal length and the F-number, an image height is a maximum image height that determines a half angle of view, and the total lens length is a distance from the first lens surface to the image plane. A back focus BF indicates a length from the last lens surface to the image plane. Moreover, a part for which an interval "d" of each optical surface is "(variable)" is changed during focusing, and surface intervals when focused at infinity and proximity (image pickup magnification) are shown in another table.

An "effective diameter" refers to a diameter of a lens that is determined by a range in which axial and off-axial rays pass. An "entrance pupil position" refers to a distance from the lens surface (first surface) closest to the object side to an entrance pupil, an "exit pupil position" refers to a distance from the lens surface (last surface) closest to the image side to an exit pupil, and a "front principal point position" refers to a distance from the first surface to a front principal point. A "rear principal point position" refers to a distance from the last surface to a rear principal point. Each numerical value is a paraxial quantity, and a sign is positive for a direction from the object side to the image side.

An aspherical shape is expressed by the following equation:

$$X = \frac{\frac{H^2}{R}}{1 + \sqrt{1 - (1+K)\left(\frac{H}{R}\right)^2}} + A4H^4 + A6H^6 + A8H^8 + A10H^{10}$$

where the X axis corresponds to the optical axis direction, the H axis corresponds to the direction perpendicular to the optical axis, the light propagation direction is positive, R represents a paraxial curvature radius, K represents a conic constant, and A4, A6, A8, and A10 each represent an aspherical coefficient. The asterisk (*) means a surface having an aspherical shape. Moreover, a relationship between parameters regarding the conditional expressions described above and Numerical Data is shown in Table 1.

[Numerical Data 1]

Unit: mm

Surface data

| Surface number | r | d | nd | vd | Effective diameter |
|---|---|---|---|---|---|
| 1 | 800.000 | 1.00 | 1.80810 | 22.8 | 27.80 |
| 2 | 33.296 | 1.92 | | | 25.64 |
| 3 | 103.801 | 3.11 | 2.00100 | 29.1 | 25.57 |
| 4 | −86.901 | 4.09 | | | 25.07 |
| 5 | −47.674 | 1.30 | 1.51742 | 52.4 | 20.44 |

-continued

Unit: mm

| | | | | | |
|---|---|---|---|---|---|
| 6 | 17.367 | 5.73 | 1.90043 | 37.4 | 21.60 |
| 7 | 777.674 | 3.72 | | | 21.26 |
| 8 (Stop) | ∞ | 3.62 | | | 20.16 |
| 9 | 64.497 | 2.12 | 1.69680 | 55.5 | 19.04 |
| 10 | −262.934 | 3.56 | | | 18.69 |
| 11* | −35.963 | 1.30 | 1.58313 | 59.4 | 17.10 |
| 12 | −93.550 | 0.13 | | | 17.19 |
| 13 | −84.988 | 6.26 | 1.88300 | 40.8 | 17.29 |
| 14 | −12.701 | 1.00 | 1.85478 | 24.8 | 18.97 |
| 15 | 135.000 | 5.27 | | | 22.77 |
| 16 | 800.000 | 7.35 | 1.90043 | 37.4 | 31.72 |
| 17 | −28.799 | (Variable) | | | 33.14 |
| 18 | −109.518 | 2.86 | 1.69680 | 55.5 | 34.06 |
| 19 | −53.092 | 11.79 | | | 34.38 |
| 20 | −29.766 | 1.70 | 1.59270 | 35.3 | 33.78 |
| 21 | −114.300 | BF | | | 36.27 |
| Image plane | ∞ | | | | |

Aspherical surface data
Eleventh surface

K = 0.00000e+000   A4 = −4.61997e−005   A6 = −9.22837e−008
A8 = −4.60687e−010   A10 = 1.65555e−013

| | | |
|---|---|---|
| Focal length | 36.00 | |
| F-number | 1.85 | |
| Half angle of view (degrees) | 31.00 | |
| Image height | 21.64 | |
| Total lens length | 80.45 | |
| BF | 11.66 | |
| Variable interval | Infinity | −0.5 (Image pickup magnification) |
| d17 | 0.95 | 18.25 |
| Entrance pupil position | 14.34 | |
| Exit pupil position | −45.98 | |
| Front principal point position | 27.86 | |
| Rear principal point position | −24.34 | |

Lens unit data

| Unit | First surface | Focal length | Lens unit structure length | Front principal point position | Rear principal point position |
|---|---|---|---|---|---|
| 1 | 1 | 99.20 | 20.87 | 15.09 | 0.76 |
| 2 | 9 | 41.43 | 27.00 | 21.32 | 1.84 |
| 3 | 18 | −148.84 | 16.35 | 24.66 | 8.68 |

Single lens data

| Lens | First surface | Focal length |
|---|---|---|
| 1 | 1 | −43.02 |
| 2 | 3 | 47.64 |
| 3 | 5 | −24.44 |
| 4 | 6 | 19.66 |
| 5 | 9 | 74.53 |
| 6 | 11 | −101.03 |
| 7 | 13 | 16.25 |
| 8 | 14 | −13.54 |
| 9 | 16 | 31.00 |
| 10 | 18 | 144.87 |
| 11 | 20 | −68.42 |

[Numerical Data 2]

Unit: mm

Surface data

| Surface number | r | d | nd | vd | Effective diameter |
|---|---|---|---|---|---|
| 1 | −900.253 | 1.00 | 1.80810 | 22.8 | 30.24 |
| 2 | 32.961 | 2.61 | | | 27.71 |
| 3 | 128.530 | 2.84 | 2.00069 | 25.5 | 27.60 |
| 4 | −85.228 | 6.20 | | | 27.31 |
| 5 | −55.357 | 1.30 | 1.51742 | 52.4 | 20.72 |
| 6 | 18.269 | 5.79 | 1.90043 | 37.4 | 21.86 |
| 7 | −463.005 | 4.28 | | | 21.58 |
| 8 (Stop) | ∞ | 3.03 | | | 20.23 |
| 9 | 59.088 | 2.09 | 1.69680 | 55.5 | 19.23 |
| 10 | −900.142 | 3.73 | | | 18.86 |
| 11* | −37.390 | 1.30 | 1.58313 | 59.4 | 17.27 |
| 12 | −57.954 | 0.47 | | | 17.17 |
| 13 | −99.383 | 5.42 | 1.88300 | 40.8 | 16.97 |
| 14 | −12.804 | 1.00 | 1.85478 | 24.8 | 18.18 |
| 15 | 76.703 | 6.93 | | | 21.41 |
| 16 | 485.755 | 7.40 | 1.90043 | 37.4 | 32.95 |
| 17 | −30.773 | (Variable) | | | 34.28 |
| 18 | −456.823 | 3.38 | 1.77250 | 49.6 | 35.40 |
| 19 | −63.996 | 9.76 | | | 35.57 |
| 20 | −31.886 | 1.70 | 1.64769 | 33.8 | 34.13 |
| 21 | −352.044 | BF | | | 36.40 |
| Image plane | ∞ | | | | |

Aspherical surface data
Eleventh surface

K = 0.00000e+000   A4 = −4.05930e−005   A6 = −8.25628e−008
A8 = −1.52011e−010   A10 = −1.03595e−012

| | | |
|---|---|---|
| Focal length | 34.53 | |
| F-number | 1.85 | |
| Half angle of view (degrees) | 32.07 | |
| Image height | 21.64 | |
| Total lens length | 83.18 | |
| BF | 12.00 | |
| Variable interval | Infinity | −1.0 (Image pickup magnification) |
| d17 | 0.95 | 36.59 |
| Entrance pupil position | 16.09 | |
| Exit pupil position | −44.80 | |
| Front principal point position | 29.63 | |
| Rear principal point position | −22.53 | |

Lens unit data

| Unit | First surface | Focal length | Lens unit structure length | Front principal point position | Rear principal point position |
|---|---|---|---|---|---|
| 1 | 1 | 90.17 | 24.02 | 20.86 | 5.04 |
| 2 | 9 | 43.97 | 28.34 | 23.13 | 1.45 |
| 3 | 18 | −160.79 | 14.84 | 29.93 | 14.53 |

Single lens data

| Lens | First surface | Focal length |
|---|---|---|
| 1 | 1 | −39.33 |
| 2 | 3 | 51.55 |
| 3 | 5 | −26.39 |
| 4 | 6 | 19.63 |
| 5 | 9 | 79.65 |
| 6 | 11 | −185.01 |
| 7 | 13 | 16.17 |
| 8 | 14 | −12.77 |
| 9 | 16 | 32.36 |
| 10 | 18 | 95.98 |
| 11 | 20 | −54.25 |

[Numerical Data 3]

Unit: mm

Surface data

| Surface number | r | d | nd | vd | Effective diameter |
|---|---|---|---|---|---|
| 1 | 95.041 | 1.00 | 1.80810 | 22.8 | 32.29 |
| 2 | 38.945 | 1.48 | | | 30.54 |
| 3 | 59.345 | 3.61 | 1.85150 | 40.8 | 30.38 |
| 4 | −330.015 | 4.05 | | | 29.74 |
| 5 | −95.390 | 1.30 | 1.51742 | 52.4 | 25.79 |
| 6 | 21.646 | 5.57 | 1.85150 | 40.8 | 25.95 |
| 7 | 104.652 | 9.09 | | | 25.46 |
| 8 (Stop) | ∞ | (Variable) | | | 23.48 |
| 9 | 53.280 | 2.56 | 1.69680 | 55.5 | 21.50 |
| 10 | −270.589 | 3.86 | | | 21.33 |
| 11* | −34.319 | 1.30 | 1.58313 | 59.4 | 19.37 |
| 12 | 92.703 | 0.94 | | | 21.64 |
| 13 | −789.653 | 7.71 | 1.88300 | 40.8 | 21.96 |
| 14 | −19.809 | 1.00 | 1.85478 | 24.8 | 24.34 |
| 15 | 361.328 | 4.16 | | | 27.85 |
| 16 | 499.288 | 7.50 | 1.85150 | 40.8 | 34.26 |
| 17 | −33.275 | (Variable) | | | 35.59 |
| 18 | 260.676 | 3.54 | 1.78800 | 47.4 | 36.82 |
| 19 | −101.202 | 9.59 | | | 36.87 |
| 20 | −46.494 | 1.70 | 1.59270 | 35.3 | 35.09 |
| 21 | 100.606 | BF | | | 36.20 |
| Image plane | ∞ | | | | |

Aspherical surface data
Eleventh surface

K = 0.00000e+000   A4 = −1.85554e−005   A6 = −1.50488e−008
A8 = −5.66749e−011   A10 = 2.00278e−013

| | | |
|---|---|---|
| Focal length | 48.50 | |
| F-number | 1.85 | |
| Half angle of view (degrees) | 24.04 | |
| Image height | 21.64 | |
| Total lens length | 95.00 | |
| BF | 15.80 | |
| Variable interval | Infinity | −0.5 (Image pickup magnification) |
| d8 | 8.29 | 7.22 |
| d17 | 0.95 | 25.95 |
| Entrance pupil position | 23.06 | |
| Exit pupil position | −49.40 | |
| Front principal point position | 35.48 | |
| Rear principal point position | −32.70 | |

Lens unit data

| Unit | First surface | Focal length | Lens unit structure length | Front principal point position | Rear principal point position |
|---|---|---|---|---|---|
| 1 | 1 | 138.71 | 26.10 | 3.85 | −16.88 |
| 2 | 9 | 50.35 | 29.03 | 22.23 | 0.67 |
| 3 | 18 | −171.07 | 14.83 | 34.99 | 18.57 |

Single lens data

| Lens | First surface | Focal length |
|---|---|---|
| 1 | 1 | −82.31 |
| 2 | 3 | 59.33 |
| 3 | 5 | −33.97 |
| 4 | 6 | 31.09 |
| 5 | 9 | 64.09 |
| 6 | 11 | −42.79 |
| 7 | 13 | 22.90 |
| 8 | 14 | −21.94 |
| 9 | 16 | 36.87 |
| 10 | 18 | 92.91 |
| 11 | 20 | −53.42 |

[Numerical Data 4]

Unit: mm

Surface data

| Surface number | r | d | nd | vd | Effective diameter |
|---|---|---|---|---|---|
| 1 | −900.110 | 1.00 | 1.75520 | 27.5 | 32.82 |
| 2 | 27.237 | 9.93 | | | 29.00 |
| 3 | 56.836 | 4.31 | 1.85150 | 40.8 | 26.44 |
| 4 | −67.479 | 1.08 | | | 25.83 |
| 5 | −63.569 | 1.30 | 1.48749 | 70.2 | 24.25 |
| 6 | 16.463 | 5.50 | 1.80400 | 46.6 | 20.75 |
| 7 | 245.867 | 6.37 | | | 20.25 |
| 8 (Stop) | ∞ | 2.32 | | | 17.94 |
| 9 | 63.799 | 1.90 | 1.69680 | 55.5 | 17.06 |
| 10 | −272.023 | 2.75 | | | 16.69 |
| 11* | −41.949 | 1.30 | 1.58313 | 59.4 | 15.21 |
| 12 | −63.818 | 0.51 | | | 14.95 |
| 13 | −106.259 | 5.02 | 1.88300 | 40.8 | 14.69 |
| 14 | −11.579 | 1.00 | 1.85478 | 24.8 | 15.96 |
| 15 | 55.726 | 6.59 | | | 18.91 |
| 16 | 143.732 | 7.32 | 1.91082 | 35.3 | 32.45 |
| 17 | −33.749 | (Variable) | | | 33.67 |
| 18 | −556.059 | 3.57 | 1.72916 | 54.7 | 34.80 |
| 19 | −59.257 | 8.89 | | | 34.98 |
| 20 | −29.069 | 1.70 | 1.85478 | 24.8 | 33.84 |
| 21 | −132.084 | (Variable) | | | 36.97 |
| Image plane | ∞ | | | | |

Aspherical surface data
Eleventh surface

K = 0.00000e+000   A4 = −4.74741e−005   A6 = −1.39075e−007
A8 = 2.72538e−010   A10 = −2.76189e−012

| | | |
|---|---|---|
| Focal length | 28.80 | |
| F-number | 1.85 | |
| Half angle of view (degrees) | 36.91 | |
| Image height | 21.64 | |
| Total lens length | 80.30 | |
| BF | 7.00 | |
| Variable interval | Infinity | −0.5 (Image pickup magnification) |
| d17 | 0.95 | 17.33 |
| d21 | 7.00 | 5.67 |
| Entrance pupil position | 17.36 | |
| Exit pupil position | −34.35 | |
| Front principal point position | 26.10 | |
| Rear principal point position | −21.80 | |

Lens unit data

| Unit | First surface | Focal length | Lens unit structure length | Front principal point position | Rear principal point position |
|---|---|---|---|---|---|
| 1 | 1 | 55.05 | 29.49 | 23.15 | 6.47 |
| 2 | 9 | 43.09 | 26.39 | 21.04 | 1.39 |
| 3 | 18 | −103.85 | 14.15 | 22.11 | 8.41 |

Single lens data

| Lens | First surface | Focal length |
|---|---|---|
| 1 | 1 | −34.99 |
| 2 | 3 | 36.82 |
| 3 | 5 | −26.68 |
| 4 | 6 | 21.71 |
| 5 | 9 | 74.34 |
| 6 | 11 | −214.62 |
| 7 | 13 | 14.36 |
| 8 | 14 | −11.14 |
| 9 | 16 | 30.61 |
| 10 | 18 | 90.69 |
| 11 | 20 | −43.94 |

[Numerical Data 5]

Unit: mm

Surface data

| Surface number | r | d | nd | vd | Effective diameter |
|---|---|---|---|---|---|
| 1 | −135.292 | 1.00 | 1.80809 | 22.8 | 27.44 |
| 2 | 34.426 | 6.07 | | | 25.37 |
| 3 | 71.397 | 3.91 | 1.90043 | 37.4 | 24.06 |
| 4 | −50.803 | 0.67 | | | 23.59 |
| 5 | −46.367 | 1.00 | 1.48749 | 70.2 | 23.53 |
| 6 | 19.477 | 6.20 | 1.90043 | 37.4 | 24.17 |
| 7 | 231.713 | 4.35 | | | 23.58 |
| 8 (Stop) | ∞ | 3.93 | | | 21.93 |
| 9 | 59.885 | 2.22 | 1.69680 | 55.5 | 21.30 |
| 10 | −868.147 | 4.02 | | | 20.83 |
| 11* | −52.901 | 5.28 | 1.76802 | 49.2 | 17.40 |
| 12 | −12.000 | 0.80 | 1.85478 | 24.8 | 17.05 |
| 13 | 77.309 | 5.41 | | | 20.21 |
| 14 | 608.518 | 6.96 | 1.91082 | 35.3 | 29.71 |
| 15 | −27.871 | (Variable) | | | 31.20 |
| 16 | −86.302 | 2.23 | 2.00100 | 29.1 | 33.01 |
| 17 | −54.807 | 11.58 | | | 33.39 |
| 18 | −30.478 | 1.60 | 1.85478 | 24.8 | 33.45 |
| 19 | −59.303 | BF | | | 35.68 |
| Image plane | ∞ | | | | |

Aspherical surface data
Eleventh surface

K = 0.00000e+000   A4 = −2.52240e−005   A6 = −1.53805e−008
A8 = −2.09324e−010   A10 = 1.60320e−012

| Focal length | 36.00 | | |
|---|---|---|---|
| F-number | 1.85 | | |
| Half angle of view (degrees) | 31.00 | | |
| Image height | 21.64 | | |
| Total lens length | 81.30 | | |
| BF | 11.57 | | |
| Variable interval | Infinity | −0.5 (Image pickup magnification) | |
| d15 | 2.52 | 20.02 | |
| Entrance pupil position | 13.88 | | |
| Exit pupil position | −44.95 | | |
| Front principal point position | 26.95 | | |
| Rear principal point position | −24.43 | | |

Lens unit data

| Unit | First surface | Focal length | Lens unit structure length | Front principal point position | Rear principal point position |
|---|---|---|---|---|---|
| 1 | 1 | 64.87 | 23.20 | 18.68 | 5.18 |
| 2 | 9 | 52.01 | 24.68 | 23.08 | 5.30 |
| 3 | 16 | −179.26 | 15.41 | 23.83 | 9.03 |

Single lens data

| Lens | First surface | Focal length |
|---|---|---|
| 1 | 1 | −33.87 |
| 2 | 3 | 33.47 |
| 3 | 5 | −28.00 |
| 4 | 6 | 23.29 |
| 5 | 9 | 80.48 |
| 6 | 11 | 19.14 |
| 7 | 12 | −12.10 |
| 8 | 14 | 29.41 |
| 9 | 16 | 144.90 |
| 10 | 18 | −75.28 |

TABLE 1

| | Example 1 | Example 2 | Example 3 | Example 4 | Example 5 |
|---|---|---|---|---|---|
| Numerical value | | | | | |
| sk | 11.660 | 12.000 | 15.800 | 7.000 | 12.000 |
| TD | 80.450 | 83.176 | 95.000 | 80.300 | 81.302 |
| f1 | 99.201 | 90.167 | 138.707 | 55.051 | 64.871 |
| f2 | 41.431 | 43.970 | 50.346 | 43.091 | 52.009 |
| f | 36.000 | 34.528 | 48.500 | 28.800 | 36.000 |
| f3 | −148.840 | −160.790 | −171.071 | −103.849 | −179.264 |
| G1vd | 22.76 | 22.76 | 22.76 | 27.51 | 22.76 |
| L2R2 | −28.799 | −30.773 | −33.275 | −33.749 | −27.871 |
| L2R1 | 800.000 | 485.755 | 499.288 | 143.732 | 608.518 |
| G1ST | 20.873 | 24.016 | 26.104 | 29.487 | 23.204 |
| STGR | 47.917 | 47.159 | 53.096 | 43.813 | 46.527 |
| Conditional Expression | | | | | |
| (1) sk/TD | 0.145 | 0.144 | 0.166 | 0.087 | 0.148 |
| (2) f1/f2 | 2.394 | 2.051 | 2.755 | 1.278 | 1.247 |
| (3) |f/f3| | 0.242 | 0.215 | 0.284 | 0.277 | 0.201 |
| (4) G1vd | 22.76 | 22.76 | 22.76 | 27.51 | 22.76 |
| (5) |L2R2/L2R1| | 0.036 | 0.063 | 0.067 | 0.235 | 0.046 |
| (6) G1ST/STGR | 0.436 | 0.509 | 0.492 | 0.673 | 0.499 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-200167, filed Oct. 16, 2017, which is hereby incorporated by reference herein in its entirety.

What is claimed is:

1. An optical system comprising a plurality of lens units, the plurality of lens units consisting of, in order from an object side to an image side, a first lens unit having a positive refractive power, an aperture stop, a second lens unit having a positive refractive power, and a third lens unit having a negative refractive power,
the first lens unit and the second lens unit being configured to move toward the object side so that an interval between the first lens unit and the third lens unit and an interval between the second lens unit and the third lens unit are increased during focusing from infinity to a close object distance,
the first lens unit including a negative lens and a positive lens arranged adjacent to and on the image side of the negative lens,
the third lens unit consisting of a positive lens G3P and a negative lens G3N arranged adjacent to and on the image side of the positive lens G3P,
wherein a conditional expression:

$$sk/TD < 0.17,$$

is satisfied where "sk" represents an equivalent air length from a lens surface on the image side of the negative lens G3N to an image plane when the optical system is focused at infinity, and TD represents a distance on an optical axis from a lens surface on the object side of a lens G1F, which is arranged closest to the object side in the optical system, to the image plane when the optical system is focused at infinity.

2. The optical system according to claim 1, wherein a conditional expression:

$$1.1 < f1/f2 < 3.0,$$

is satisfied where "f1" represents a focal length of the first lens unit, and "f2" represents a focal length of the second lens unit.

3. The optical system according to claim 1, wherein a conditional expression:

$$0.15 < |f/f3| < 0.40,$$

is satisfied where "f" represents a focal length of the optical system, and "f3" represents a focal length of the third lens unit.

4. The optical system according to claim 1, wherein a conditional expression:

$$15.0 < G1vd < 30.0,$$

is satisfied where G1vd represents an Abbe number of a material of the lens G1F with respect to a d-line.

5. The optical system according to claim 1, wherein the second lens unit includes a lens G2R having a positive refractive power, which is arranged closest to the image side in the second lens unit, and satisfies a conditional expression:

$$|L2R2/L2R1| < 0.3,$$

where L2R1 represents a curvature radius of a lens surface on the object side of the lens G2R, and L2R2 represents a curvature radius of a lens surface on the image side of the lens G2R.

6. The optical system according to claim 1, wherein a conditional expression:

$$0.3 < G1ST/STGR < 0.8,$$

is satisfied where G1ST represents a distance on the optical axis from the lens surface on the object side of the lens G1F to the aperture stop, and STGR represents a distance on the optical axis from the aperture stop to the lens surface on the image side of the negative lens G3N when the optical system is focused at infinity.

7. The optical system according to claim 1, wherein the third lens unit is configured not to move during focusing.

8. The optical system according to claim 1, wherein the second lens unit includes a plurality of positive lenses, and a positive lens arranged closest to the object side of the plurality of positive lenses included in the second lens unit is configured to move in a direction having a component perpendicular to the optical axis for image stabilization.

9. The optical system according to claim 1, wherein the first lens unit and the second lens unit are configured to move integrally toward the object side, and the third lens unit is configured not to move for focusing from infinity to a close object distance.

10. The optical system according to claim 1, wherein the first lens unit and the second lens unit are configured to move toward the object side so that an interval between the first lens unit and the second lens unit is reduced, and the third lens unit is configured not to move for focusing from infinity to a close object distance.

11. The optical system according to claim 1, wherein the first lens unit and the second lens unit are configured to move integrally toward the object side, and the third lens unit is configured to move toward the image side for focusing from infinity to a close object distance.

12. An image pickup apparatus comprising:
a optical system comprising a plurality of lens units,
the plurality of lens units consisting of, in order from an object side to an image side, a first lens unit having a positive refractive power, an aperture stop, a second lens unit having a positive refractive power, and a third lens unit having a negative refractive power,
the first lens unit and the second lens unit being configured to move toward the object side so that an interval between the first lens unit and the third lens unit and an interval between the second lens unit and the third lens unit are increased during focusing from infinity to proximity,
the first lens unit including a negative lens and a positive lens arranged adjacent to and on the image side of the negative lens,
the third lens unit consisting of a positive lens G3P and a negative lens G3N arranged adjacent to and on the image side of the positive lens G3P,
wherein a conditional expression:

$$sk/TD < 0.17,$$

is satisfied where "sk" represents an equivalent air length from a lens surface on the image side of the negative lens G3N to an image plane when the optical system is focused at infinity, and TD represents a distance on an optical axis from a lens surface on the object side of a lens G1F, which is arranged closest to the object side in the optical system, to the image plane when the optical system is focused at infinity; and
an image pickup element configured to receive an image formed by the optical system.

* * * * *